United States Patent
Yeh et al.

(10) Patent No.: US 8,195,966 B2
(45) Date of Patent: Jun. 5, 2012

(54) ELECTRONIC DEVICE FOR REDUCING POWER CONSUMPTION DURING OFF OF COMPUTER MOTHERBOARD

(75) Inventors: Chun-Te Yeh, Jung-Ho (TW); Chung-Wen Chen, Jung-Ho (TW)

(73) Assignee: Micro-Star International Co., Ltd., Taipei Hsien (TW)

( * ) Notice: Subject to any disclaimer, the term of this patent is extended or adjusted under 35 U.S.C. 154(b) by 568 days.

(21) Appl. No.: 12/392,688

(22) Filed: Feb. 25, 2009

(65) Prior Publication Data
US 2010/0125743 A1 May 20, 2010

(30) Foreign Application Priority Data
Nov. 20, 2008 (TW) .............................. 97144790 A

(51) Int. Cl.
*G06F 1/00* (2006.01)
*G06F 1/32* (2006.01)
(52) U.S. Cl. ......... 713/310; 713/320; 713/323; 713/324
(58) Field of Classification Search .................. 713/300, 713/310, 320, 323, 324
See application file for complete search history.

(56) References Cited

U.S. PATENT DOCUMENTS

| | | | | |
|---|---|---|---|---|
| 6,266,776 B1* | 7/2001 | Sakai | ............................. | 713/300 |
| 6,499,102 B1* | 12/2002 | Ewertz | ............................. | 713/1 |
| 6,678,831 B1* | 1/2004 | Mustafa et al. | ............... | 713/320 |
| 6,684,338 B1* | 1/2004 | Koo | ............................. | 713/300 |
| 6,691,234 B1* | 2/2004 | Huff | ............................. | 713/300 |
| 2005/0223245 A1* | 10/2005 | Green et al. | .................. | 713/300 |
| 2006/0036880 A1* | 2/2006 | Maezawa | ...................... | 713/300 |
| 2006/0101292 A1* | 5/2006 | Hahn et al. | .................... | 713/300 |
| 2006/0236132 A1* | 10/2006 | Chen et al. | .................... | 713/300 |
| 2008/0082841 A1* | 4/2008 | Juenemann et al. | .......... | 713/300 |
| 2010/0332870 A1* | 12/2010 | Chen et al. | .................... | 713/320 |

OTHER PUBLICATIONS

Starzyk, Janusz A., et al. "A DC-DC Charge Pump Design Based on Voltage Doublers". IEEE Transactions on Circuits and Systems—I: Fundamental Theory and Applications. vol. 48, No. 3. Mar. 2001. pp. 350-359.*
Deng-Qi. "A primer on high-side FET load switches (Part 2 of 2)". EE Times. Online May 7, 2007. Retrieved from Internet Aug. 26, 2011. <http://www.eetimes.com/General/DisplayPrintViewContent?contentItemid=4009944>.*

* cited by examiner

*Primary Examiner* — Thoams J Cleary
(74) *Attorney, Agent, or Firm* — Apex Juris, pllc; Tracy M. Heims

(57) ABSTRACT

The present invention is an electronic device having a first device and a second device for reducing power consumption of a computer motherboard. When the computer motherboard is at an S4 or S5 state of an ACPI, the electronic device makes the computer motherboard enter like G3 mechanical off state of the ACPI. The second device determines that when the S4 or S5 state happens makes the first device to cut off a portion of electric components, for example the SIO chip and Southbridge chip, consuming stand-by power, and only supply the stand-by power to the electronic device itself. After the user pressed the power button, the second device will control the first device to connect the stand-by power to the computer motherboard.

8 Claims, 2 Drawing Sheets

ELECTRONIC DEVICE FOR REDUCING POWER CONSUMPTION DURING OFF OF COMPUTER MOTHERBOARD

FIELD OF THE INVENTION

The present invention relates to an electronic device for reducing power consumption during power off of computer motherboard, and particularly to a computer motherboard at S5 soft off state of ACPI, which will make the computer motherboard enter like G3 mechanical off state of ACPI.

BACKGROUND OF THE INVENTION

Currently, the conventional computer motherboard is conformed to the Advanced Configuration and Power Interface (ACPI) specification. Despite of entering S5 soft off state, because of the hardware design factor for the conventional computer motherboard, it cannot effectively further reduce the power consumption after power off. At this time, if the conventional computer motherboard employs the components with larger power consumption, instead of achieving the power saving, it consumes more power and causes the implicit increase of power cost.

In order to solve the above-mentioned power consumption problem, the related prior art is to employ the individual control method on the conventional computer motherboard, which is to respectively cut off the input stand-by power portion for each power-consuming component. Although the method of the prior art can be applied to the same batch of computer motherboards with the same design, for another batch of computer motherboards with different design, it needs to make a special design suitable for them The prior art will cause the waste of repetitive design, and implicitly increase the manufacturing cost for computer motherboards.

The U.S. Pat. No. 6,266,776 titled "ACPI sleep control" disclosed that when the status of the internal battery or the external power supply has changed, the change can be detected by the embedded controller. The change will employ the Power Management Event Signal (POWER_PME) and SCI interrupt, so the operating system will be notified of this change. The current system state of the operating system will be switched to another system state. U.S. Pat. No. 6,266,776 did not disclose that, at S5 soft off state of ACPI, the computer motherboard can be further enabled to enter like G3 mechanical off state of ACPI.

In view of the problems of the conventional computer motherboards, the inventors of the present invention worked hard and proposed an electronic device for reducing power consumption during power off of computer motherboards to solve these problems

SUMMARY OF THE INVENTION

The first object of the present invention is to provide an electronic device for reducing power consumption during power off of computer motherboards.

The second object of the present invention is to provide a computer motherboard, which, when being at S5 soft off state of ACPI, will enter like G3 mechanical off state of ACPI.

In order to accomplish the first object of the present invention, the present invention provides an electronic device for reducing power consumption during power off of computer motherboards, which employs a computer motherboard conformed to the Advanced Configuration and Power Interface (ACPI) specification. The electronic device comprises: a first device configured to control the stand-by power of a power supply to form a closed or opened connection with the computer motherboard; a second device configured to receive a power switching signal generated by a power switch, and, after receiving the power switching signal, to make the first device control the stand-by power to form an electrical connection with the computer motherboard, and to copy the power switching signal and output the copied power switching signal to the computer motherboard, and to determine that when the computer motherboard is at S4 state or S5 state of ACPI, make the first device control the stand-by power to form an electrical disconnection with the computer motherboard; wherein, the first device and the second device are electrically connected to the stand-by power.

In order to accomplish the second object of the present invention, the present invention provides a computer motherboard, in which the computer motherboard is conformed to the Advanced Configuration and Power Interface (ACPI) specification, which comprises: a first device configured to control the stand-by power of a power supply to form an electrical connection or disconnection with the computer motherboard; a second device configured to receive a power switching signal generated by a power switch, and, after receiving the power switching signal, to make the first device control the stand-by power to form an electrical connection with the computer motherboard, and to copy the power switching signal and output the copied power switching signal to the computer motherboard, and to determine that when the computer motherboard is at S4 state or S5 state of ACPI, make the first device control the stand-by power to form an electrical disconnection with the computer motherboard; wherein, the first device and the second device are electrically connected to the stand-by power.

To further appreciate and understand the structure, features and effects of the present invention, the preferred embodiments are disclosed and detailed described in connection with the drawings as follows:

BRIEF DESCRIPTION OF DRAWINGS

The aforesaid objectives, characteristics and advantages of the present invention will be more clearly understood when considered in conjunction with the detailed description of the accompanying embodiment and drawings, in which.

DETAILED DESCRIPTION OF THE INVENTION

Figure 1:
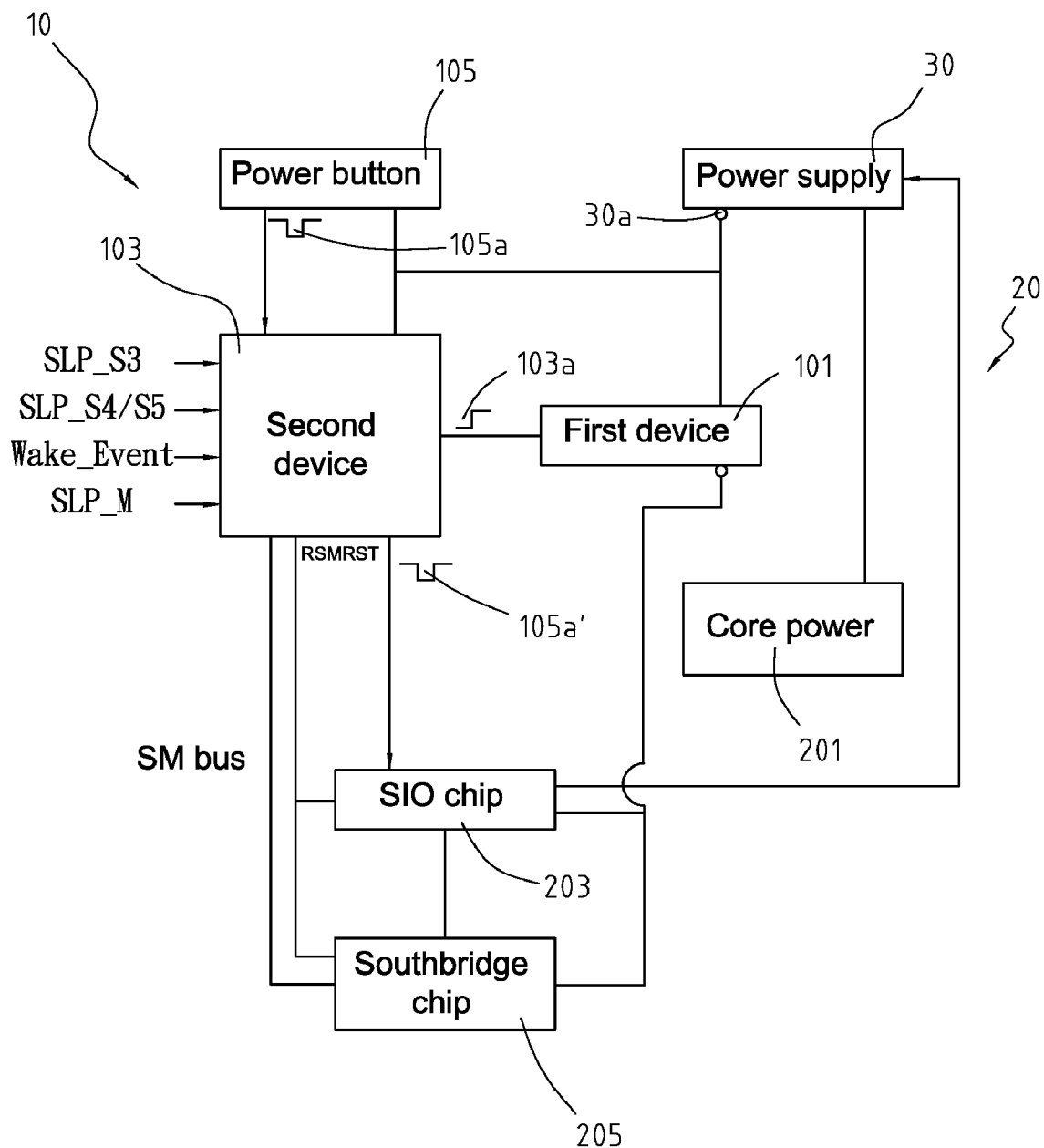
FIG. 1 is a structural diagram for an electronic device for reduction power consumption during power off of computer motherboards according to the present invention.
Figure 2:
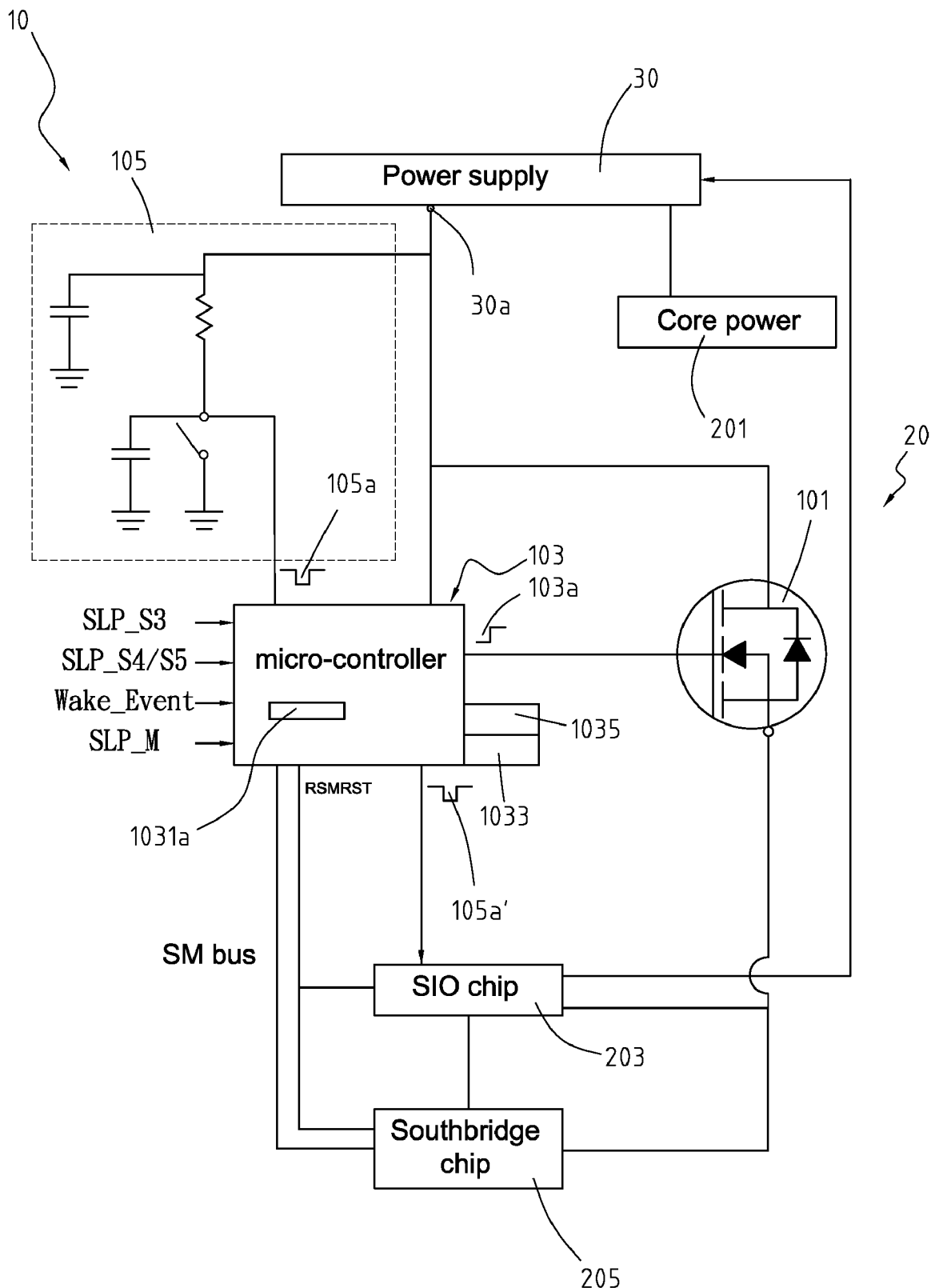
FIG. 2 is an embodiment of the present invention according to FIG. 1.

Please refer to FIG. 1 and FIG. 2. In order to disclose the convenience of the present invention and for easy understanding, the computer motherboards 20 in FIGS. 1 and 2 are only presented with the hardware components directly related to the present invention. The other components belonging to the computer motherboard 20 are not directly related to the present invention, so they will be omitted in the drawings. The electronic device 10 for reducing power consumption during power off of computer motherboard according to the present invention has the major function of isolating the stand-by power 30a, such as 5V (or one of 3V, 12V, 19V, and etc.) stand-by power, of the power supply 30, such as ATX power supply, from entering the computer motherboard 20. After soft off of the computer motherboard 20, the electronic device 10 will cut off a portion of electric components consuming the stand-by power 30a on the computer motherboard 20, and only supply the stand-by power to the electronic device 10 itself. When the user pressed the power button, the electronic device 10 will connect the stand-by power 30a to the computer motherboard 20.

The electronic device 10 can be applied to the computer motherboard conformed to the Advanced Configuration and Power Interface (ACPI) specification. The skilled in the art will all appreciate that when the computer motherboard is at S5 soft off state of ACPI, a portion of electric components of the conventional computer motherboard will still consume the stand-by power. Compared to the present invention, when the computer motherboard 20 equipped with the electronic device 10 is at S5 soft off state of ACPI, the electronic device 10 will make the computer motherboard 20 enter like G3 mechanical off state of ACPI. At this time, only the electronic device 10 and the electric components related to the power button will consume the stand-by power, while all the other electric components of the computer motherboard 20 consume no stand-by power at all.

In addition to the stand-by power 30a, the other power supply from the power supply 30, such as +12V, −12V, +5V, 3.3V, and etc, will be directly connected to the core power 201 on the computer motherboard 20.

Please refer to the comparison table below, which compares the consumption of stand-by power at S5 soft off state of ACPI between the conventional computer motherboard, and the computer motherboard 20 according to the present invention.

| Title of Electric component | Whether the conventional computer motherboard consumes the stand-by power | Whether the motherboard according to the present invention consumes the stand-by power |
| --- | --- | --- |
| Chipset | Yes | No |
| LAN Chip | Yes | No |
| Audio Chip | Yes | No |
| Super Input Output Chip | Yes | No |
| Serial Peripheral Interface ROM | Yes | No |
| Electronic device 10 | No | Yes |

From the comparison table above, the computer motherboard 20 equipped with the electronic device 10 will surely reduce the power consumption as much as possible to the minimum than the conventional computer motherboard will do.

The electronic device 10 according to the present invention can reduce the power consumption of the computer motherboard 20 after power off waiting for power on. The electronic device 10 comprises a first device 101 and a second device 103, which are respectively described as follows.

The main function of the first device 101 is used to control the stand-by power 30a of the power supply 30 forming an electrical connection or disconnection with the computer motherboard 20. The specific component of the first device 101 can employ the MOSFET (Metal-oxide semiconductor field effective transistor). With the control on the gate of MOSFET 101 through the second device 103, it can achieve the control of forming an electrical connection or disconnection between the stand-by power 30a of the power supply 30 and the computer motherboard 20.

The functions of the second device 103 are described respectively as follows. The main elements for specifically implementing the second device 103 comprise at least a micro-controller 1031. The first function of the second device 103 is used to receive the power switching signal 105a generated by the power button 105, and, after receiving the power switching signal 105a, to make the first device 101 control the stand-by power 30a and the computer motherboard 20 to form an electrical connection. Except the electronic device 10 and the electric components related to the power button 105, the computer motherboard 20 is a completely electrical disconnection with the stand-by power 30a under the power off state. Thus, when the micro-controller 1031 received the power switching signal 105a, the micro-controller 1031 will output a connection control signal 103a to the gate of the MOSFET 101, so as to conduct the MOSFET 101, and form an electrical connection between the stand-by power 30a and the computer motherboard 20. From this moment on, all of the electric components of the computer motherboard 20 can be supplied by the stand-by power 30a.

However, if the MOSFET 101 after being conducted has too large an instant current go through it, it is possible that the MOSFET 101 will be burned out due to overloading. The present invention can add a soft start circuit unit 1033 for preventing the MOSFET 101 from burning out. The soft start circuit unit 1033 can be implemented using the related conventional circuit means.

Moreover, in order to increase the control voltage so as to be able to employ the MOSFET 101 with lower cost, the present invention can add a charge pump circuit unit 1035. The charge pump circuit unit 1035 can be implemented using the related circuit means.

The second function of the second device 103 is used to copy the power switching signal 105a, and output the copied power switching signal 105a' to the computer motherboard 20. The computer motherboard 20 supplied with the stand-by power 30a will generate a RSMRST signal (RSMRST signal can be generated by, for example, the second device 103 or SIO chip 203), and transmit it to the Southbridge chip 205. The second device 103 will wait for a predetermined period of time. The length of the predetermined period of time depends on the waiting time required by the computer motherboard 20 to complete generating the RSMRST signal, for example, the predetermined time can be 100 ms. The micro-controller 1031, after the MOSFET 101 being conducted, will immediately wait for the predetermined time of 100 ms. After 100 ms elapses, the micro-controller 1031 will immediately generate a power switching signal 105a', and transmit the power switching signal 105a' to the SIO chip 203. After the SIO chip 203 receives the power switching signal 105a', the power on operation of the computer motherboard 205 is exactly the same as that of the conventional computer motherboard.

The third function of the second device 103 is used to determine when the computer motherboard 20 is at the sleep mode S4 state or S5 state of ACPI, make the first device 101 control the stand-by power 103a to form an electrical disconnection with the computer motherboard 20.

After the user of the computer motherboard 20 issued the power off command for power off in the window operating system, the computer motherboard 20 will enter the sleep mode S4 state or S5 state of ACPI shortly. The micro-controller 1031 will receive the S4 or S5 signal state, and cut off the MOSFET 101, so the stand-by power 30a will form an electrical disconnection with the computer motherboard 20.

The second device 103 according to the present invention can also employ the Application Specific Integrated Circuit (ASIC) as an embodiment. The truth table for ASIC 103 is show below:

| ACPI state | Signal 105a | wake signal | S3 signal | S4 signal | SLP_M signal | Stand-by power 30a' | Signal 103a | Signal 105a' |
|---|---|---|---|---|---|---|---|---|
| G3->S0 | ⎍ | 0 | 0->1 | 0->1 | 0->1 | 0->1 | 0->1 | Output after waiting 100 ms. ⎍ |
| S0->S4/ S5->G3 | ⎍ | 0 | 1->0 | 1->0 | 1->0 | 1->0 | 1->0 | Output ⎍ |
| S0->G3 | ⎍ | 0 | 1->0 | 1->1 | 1->0 | 1->1 | 1->1 | Output ⎍ |
| S3->S0 | ⎍ | 0 | 0->1 | 1->1 | 0->1 | 1->1 | 1->1 | Output ⎍ |
| AMT ON | ⎍ | 0 | X | X | 1 | 1 | 1 | Output ⎍ |
| Wake Event Enable | ⎍ | 0 | X | X | X | 1 | 1 | Output ⎍ |

The electronic device 10 according to the present invention can not only process the power switching signal 105a from the power button 105, but also further process the sleep mode S4 and S5 signal of ACPI, and the Wake_Event signal. The above-mentioned sleep mode S4 and S5 signal, the Wake_Event signal, and the SLP_M signal are all from the Southbridge chip 205, wherein the SLP_M signal is a control signal related to the Active Management Technology (AMT) from Intel™ on a motherboard, and the function of SLP_M signal is to be used by a remote wake-up system of network management.

The SIO chip 203 and Southbridge chip 205 can both directly employ the conventional SIO chip and the conventional Southbridge chip.

The SIO chip 203 and Southbridge chip 205 can both directly employ the conventional SIO chip and the conventional Southbridge chip.

The electronic device 10 according to the present invention can be configured on the computer motherboard 20, or the electronic device 10 according to the present invention can be integrated into the SIO chip 203 on the computer motherboard 20.

The embedded memory 1031a of the micro-controller 1031 can be used as firmware. The embedded memory 1031a can be used to store and execute the program codes of the above-mentioned first, second and third functions. Furthermore, the micro-controller 1031 can be connected to the Southbridge chip 205 through the SM bus, so that the update for new firmware of the micro-controller 1031 can be completed through the SM bus.

The present invention provides an electronic device for reducing power consumption during power off of computer motherboards, so that when the computer motherboard is at S5 soft off state of ACPI, it will make the computer motherboard enter like G3 mechanical off state of ACPI for automatically achieving the power saving. This feature is the advantage and the maximum feature of the present invention.

The above detailed description is only for the preferred embodiments according to the present invention, which cannot be used to limit the scope of the application for the present invention. Those skilled in the art substantially can make a variety of changes and modifications, which shall not depart from the substantial content of the present invention.

What is claimed is:

1. An electronic device for reducing power consumption during power off of a computer motherboard, which is applied to the computer motherboard conformed to an Advanced Configuration and Power Interface (ACPI) specification, and the electronic device comprises:
   a first device, configured to control a stand-by power of a power supply to form an electrical connection or an electrical disconnection with an SIO (Super Input Output) chip and a Southbridge chip of the computer motherboard;
   a second device, configured to receive a power switching signal generated by a power button, and, after receiving the power switching signal, to make the first device control the stand-by power to form the electrical connection with the SIO chip and the Southbridge chip of the computer motherboard, and, to copy the power switching signal and output the copied power switching signal to the computer motherboard, and, according signals from the Southbridge chip to determine that when the computer motherboard is at S4 state or S5 state of ACPI make the first device control the stand-by power to electrically form the electrical disconnection with the computer motherboard so as to make disconnection the SIO chip and the Southbridge chip from the stand-by power;
   wherein, the first device and the second device are electrically connected to the stand-by power, and the first device is electrically connected to the SIO chip and the Southbridge chip.

2. The electronic device according to claim 1, further comprises: a charge pump circuit unit.

3. The electronic device according to claim 1, further comprises: a soft start circuit unit.

4. The electronic device according to claim 1, wherein the second device is a micro-controller or an application specific integrated circuit (ASIC).

5. A computer motherboard, wherein the computer motherboard is conformed to an Advanced Configuration and Power Interface (ACPI) specification, which comprises:
   a first device, configured to control a stand-by power of a power supply to form an electrical connection or an electrical disconnection with an SIO (Super Input Output) chip and a Southbridge chip of the computer motherboard;
   a second device, configured to receive a power switching signal generated by a power button, and, after receiving the power switching signal, to make the first device control the stand-by power to form the electrical connection with the SIO chip and the Southbridge chip of the computer motherboard, and, to copy the power switching signal and output the copied power switching signal to the computer motherboard, and, according signals from the Southbridge chip to determine that when the computer motherboard is at S4 state or S5 state of ACPI, make the first device control the stand-by power to electrically form the electrical disconnection with the computer motherboard so as to make disconnection the SIO chip and the Southbridge chip from the stand-by power;

wherein, the first device and the second device are electrically connected to the stand-by power and the first device is electrically connected to the SIO chip and the Southbridge chip.

6. The computer motherboard according to claim 5, further comprises:

a charge pump circuit unit.

7. The computer motherboard according to claim 5, further comprises:

a soft start circuit unit.

8. The computer motherboard according to claim 5, wherein the second device is a micro-controller or an application specific integrated circuit (ASIC).

* * * * *